(No Model.) 6 Sheets—Sheet 1.
A. L. RASMUSON.
COMBINED CORN HARVESTER AND HUSKER.
No. 396,510. Patented Jan. 22, 1889.
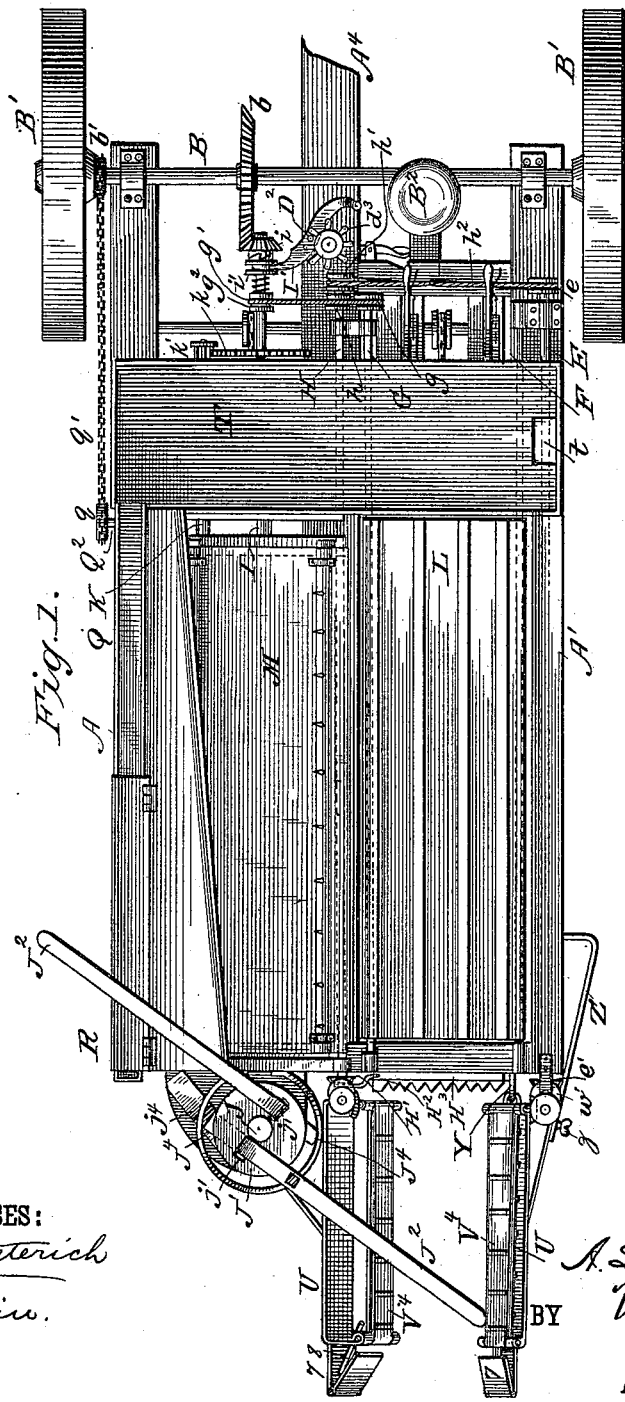
WITNESSES:
INVENTOR:
A. L. Rasmuson
BY Munn & Co
ATTORNEYS.

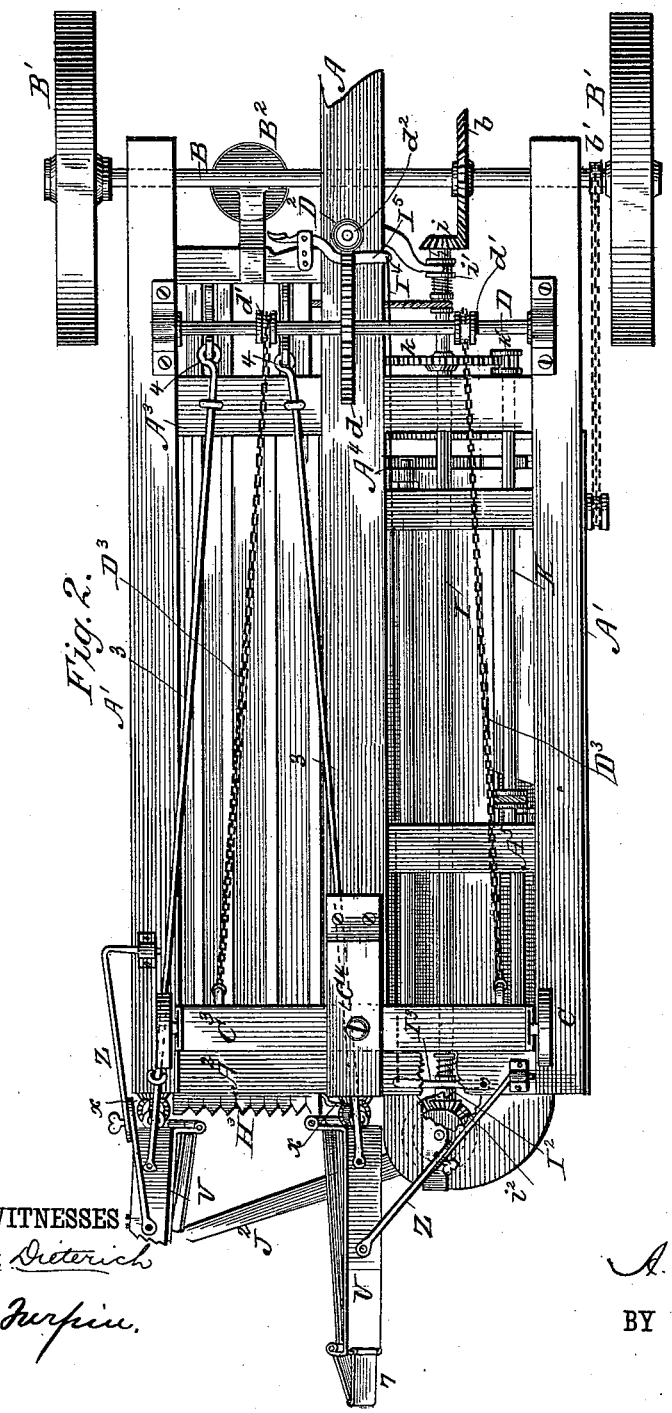

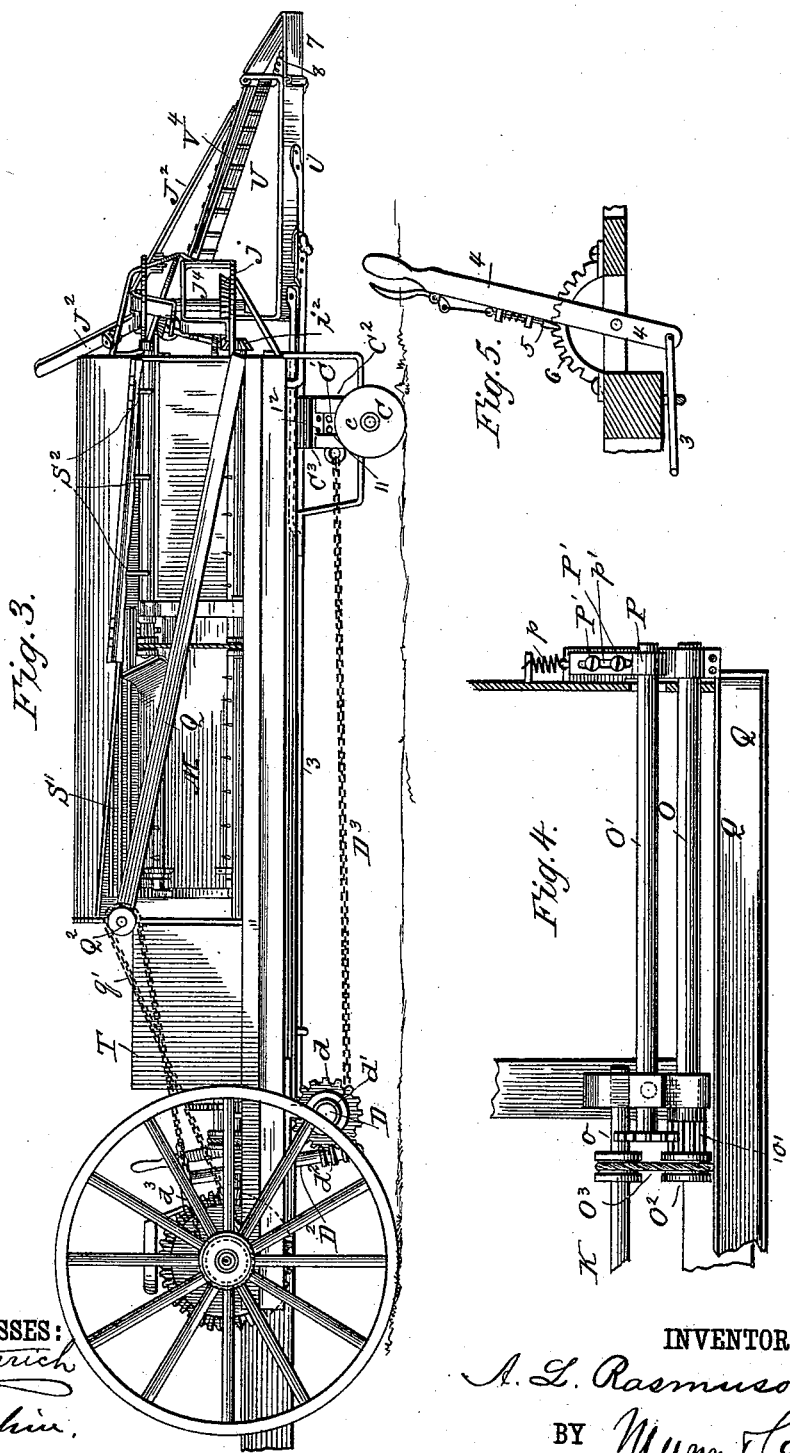

(No Model.) 6 Sheets—Sheet 4.

A. L. RASMUSON.
COMBINED CORN HARVESTER AND HUSKER.

No. 396,510. Patented Jan. 22, 1889.

WITNESSES:
Fred G. Dieterich
P. B. Turpin.

INVENTOR:
A. L. Rasmuson
BY Munn & Co
ATTORNEYS.

(No Model.) 6 Sheets—Sheet 5.
A. L. RASMUSON.
COMBINED CORN HARVESTER AND HUSKER.
No. 396,510. Patented Jan. 22, 1889.
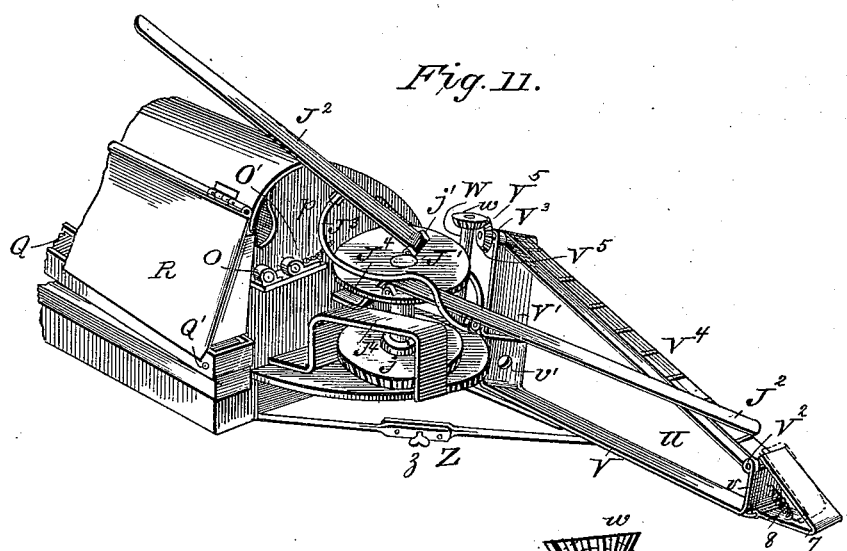
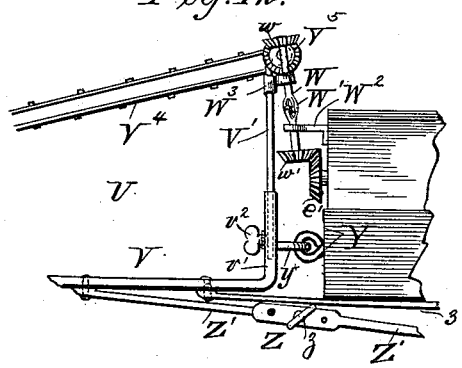
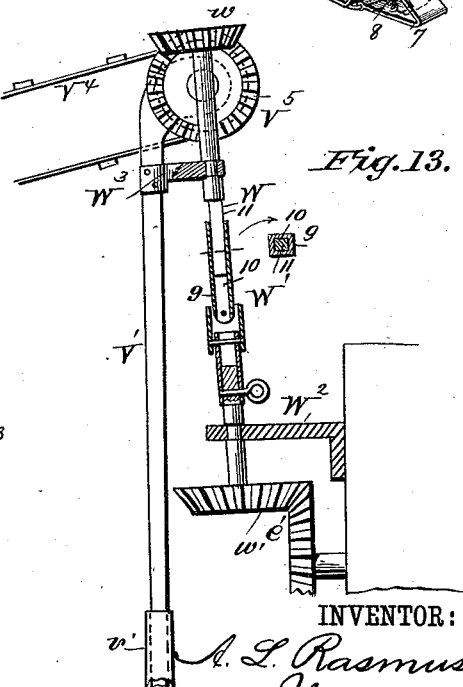
WITNESSES:
Fred G. Dieterich
P. B. Turpin
INVENTOR:
A. L. Rasmuson
BY Munn & Co
ATTORNEYS.

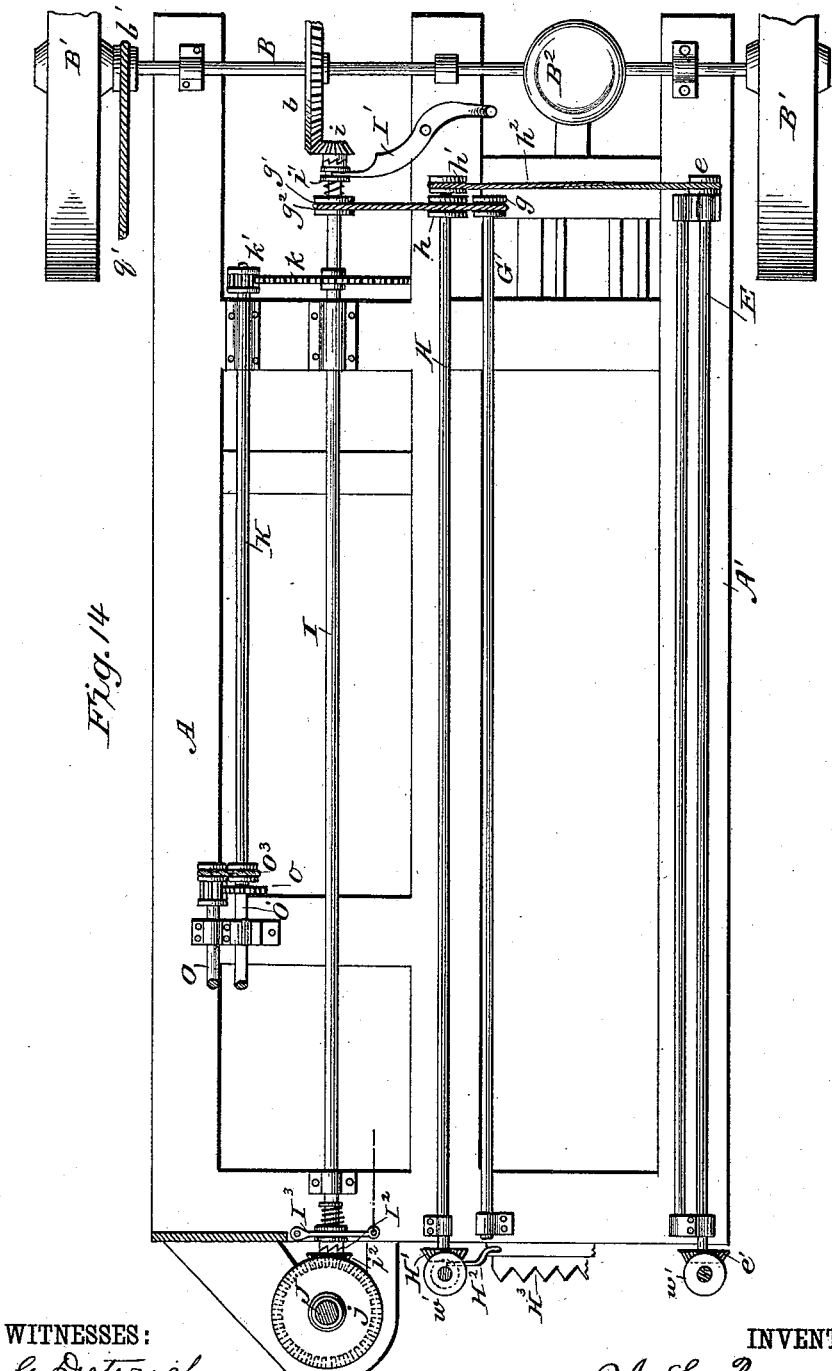

United States Patent Office.

ANDREW L. RASMUSON, OF CLERMONT, IOWA.

COMBINED CORN HARVESTER AND HUSKER.

SPECIFICATION forming part of Letters Patent No. 396,510, dated January 22, 1889.

Application filed January 24, 1887. Serial No. 225,305. (No model.)

*To all whom it may concern:*

Be it known that I, ANDREW L. RASMUSON, of Clermont, in the county of Fayette and State of Iowa, have invented a new and useful Improvement in Combined Corn Harvester and Husker, of which the following is a specification.

My invention is an improved corn harvester and husker; and it consists in certain features of construction and novel combinations of parts, as will be described and claimed.

Figure 6:
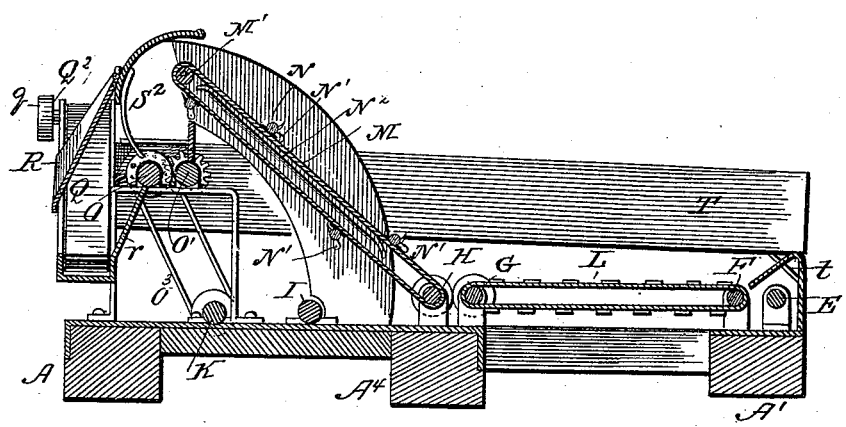
Figure 7:
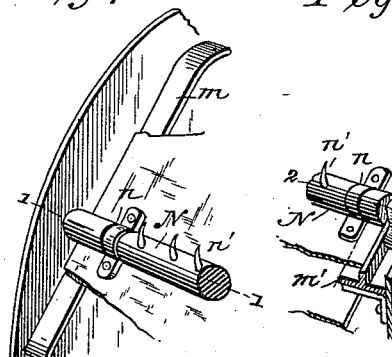
Figure 8:
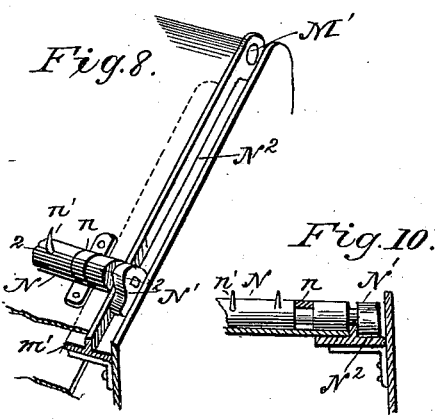
Figure 10:
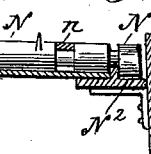
Figure 9:
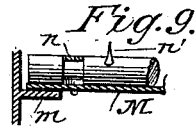

In the drawings, Figure 1 is a top plan view of my machine. Fig. 2 is a bottom plan view thereof. Fig. 3 is a side elevation. Fig. 4 is a detached plan view of the husking-rolls. Fig. 5 is a detail view of one of the levers and the detent mechanism therefor. Fig. 6 is a transverse section of the machine. Fig. 7 is a detail view showing the manner of supporting the forward end of the elevator-apron. Fig. 8 is a detail view showing the construction for supporting the rear edge of the elevator-apron. Figs. 9 and 10 are detail sections on lines 1 1, Fig. 7, and 2 2, Fig. 8, showing the carrier-shafts of said elevator-apron. Figs. 11 and 12 are detail views. Fig. 13 is a detail view enlarged, illustrating the gearing for driving the gatherer-belt; and Fig. 14 is a skeleton view of the drive-gearing.

The framing of the machine comprises side beams, A A', front and rear beams, $A^2$ $A^3$, and intermediate lengthwise and cross beams, $A^4$ $A^5$. The beam $A^4$ may be extended rearwardly and suitable attachments be connected thereto for the team, which moves in rear of and pushes the machine forward in the operation, as will be described.

The drive-axle B is journaled to the main frame near the rear end of the latter and has the wheels B' fixed to it. To this axle I also fix a gear-wheel, $b$, and a pulley, $b'$. It is preferred to arrange the operator's seat B near this axle, as shown.

The front wheels C are journaled on stud-axles $c$, projected from bars C', which are adjustably supported in guides $C^2$, supported on an axle-beam, $C^3$, which is pivotally connected at $C^4$ centrally between its ends with the framing. The bars C' and the guide $C^2$ have holes 12 for the bolts 13, which secure the wheel-carrying bars to the guide, and by setting the bolts 13 into different holes 12 the wheels C may be secured in any desired adjustment.

A shaft, D, is journaled transversely to the framing near the rear end of same, and is provided with a worm-wheel, $d$, and with pulleys $d'$ $d'$. The worm-wheel $d$ is meshed by a worm, $d^2$, on shaft $D^2$, which shaft extends into convenient reach of the operator, and has a hand-wheel, $d^3$, by which it may be turned. By turning this worm-shaft, therefore, the shaft D may be turned in one or the other direction. Chains or cords $D^3$ are connected at their rear ends with pulleys $d'$, and extend thence forward, passing one above and the other below their pulleys $d'$, so that the turning of shaft D will draw on one and relax the other chain $D^3$, and such chains are attached at their forward ends to beam $C^3$, on opposite sides of the pivotal center of said beam. Thus by turning the shaft D the front wheel-support may be turned to guide the machine to one or the other side, as may be desired.

To the frame I journal the longitudinal shafts E, F, G, H, and I, which extend, practically, the full length of the main portion of the machine. The shaft I is provided at its rear end with a bevel-gear, $i$, meshed with gear $b$, and such gear $i$ may be keyed to shaft I by sliding clutch-section $i'$, which clutch-section is spring-actuated into engagement with pinion $i$, and may be held out of said engagement by the proper manipulation of the lever I', as will be understood from Fig. 1. The forward end of shaft I is provided with pinion $i^2$, which may be keyed to the shaft I by clutch $I^2$, and such clutch is engaged by a lever, $I^3$, which in turn is connected by rod or cord $I^4$ with a lever, $I^5$, arranged in convenient reach of the operator. The pinion $i^2$ is meshed with gear $j$ on the reel-shaft J, which shaft is provided with a support or carrying-disk, J', for the reel-arms $J^2$. These arms are pivoted at $j'$ to support J and bear in front of said pivots on the rail or track $J^3$, which is suitably formed to permit the arms $J^2$ to descend when they sweep back over the gatherers and to elevate said arms after they have forced the cut stalks onto the carrier-apron. These arms are extended at $J^4$ in rear of their pivots, and a bearing, $j^4$, which may be a plate, as shown, is arranged to receive the down pressure of such extensions when the arms are arranged over the gatherers, as shown in Fig. 1, and prevent the forward ends of the arms from being forced up by the massing thereunder of the butts of the cut stalks as they fall onto the carrier-apron. The shafts G and H have pulleys $g$ and $h$, and are driven by a belt, $g'$, running over pulleys $g$ and $h$ and over a pulley, $g^2$, fixed on shaft I. The shaft H has also a pulley, $h'$, geared by a twist-belt, $h^2$, with a pulley, $e$, on shaft E. The shaft I, it will be seen, serves to drive shafts E, G, and H, and it is also geared by wheel $k$ with a pinion, $k'$, on a counter-shaft, K. The shaft I therefore operates as a main shaft, and it is desirable to provide it with the two independent clutches, so it and the shafts it drives may be thrown out of motion or the reel may simply be stopped, as circumstances may require. At its forward end the shaft H has a pinion, H', and it is also provided with a crank-pin which is connected by pitman H² with the cutter-bar H³. In rear of this cutter-bar I arrange the carrier-apron L, which is supported on shafts F and G, and is driven by the latter to carry the stalks dropped on it toward shaft G, and at its edge, supported by said shaft G, the apron L discharges to the elevator-apron M. This apron M inclines upward from apron L, being supported at its lower end around shaft H, from which it receives motion, and at its upper end on a shaft, M', as shown in Figs. 6 and 8. This apron M has its upper sides rested at its edges on rails $m\ m'$, by which the upper section of the elevator-apron is supported, and is prevented from undue depression by the weight of the stalks being elevated.

In bearings $n$, fixed or formed on said apron M, I journal shafts N, which are provided with spurs $n'$. At one end the shafts extend beyond the edge of the apron, and are provided at such ends with crank-arms or tappets N', which engage a bearing-rail, N², when the shafts N are above said rail. This rail extends from about the lower edge of the elevator-apron nearly to its upper end, as will be seen in Figs. 6 and 8, and in position to engage the cams of the shafts as they move upward, and secure such shafts in the position shown in Fig. 8 until they reach the crown or upper end of the apron, when the weight of the cam will be sufficient to turn the shafts to the position shown on the descending portion of the apron in Fig. 6, so that the stalks or canes will not be carried down by the teeth or spurs of the shafts, but will fall onto the husking-rolls O O', arranged below the upper or discharge end of the elevator-apron. These rollers O O' have pinions $o\ o'$, intermeshed so that the turning of one roller will effect a turning of the other, and the roller O has a pulley, O², geared by a belt, O³, with a pulley on the counter-shaft K. One of the rollers, usually O', as shown, is journaled at one end in a movable bearing, P, and is pressed by spring $p$ toward the roller O. Screws P' are turned through slots $p'$ in the bearing P into a fixed part of the framing, and may be tightened to secure the rolls O O' in any desired relative arrangement, or may be loosened to permit the roll O' to yield against the action of spring $p$. It will be understood that when the stalks or canes are of uniform size the rollers may be fixed; but when the canes vary in size the rolls should be set for the smaller canes and permitted to spread to allow the passage of the larger ones. The corn is husked by these rolls O O' and delivered into the elevator Q, which is arranged alongside the rolls, and is journaled at its ends on shafts Q' Q², the upper one, Q², of which is provided with a pulley, $q$, and is geared by belt $q'$ with pulley $b'$ on axle B. Shields R and $r$ are provided, the one to prevent the husked ears being discharged over the side of the elevator Q, and the other, $r$, to prevent the blades, husks, and canes getting into said elevator after they have passed through the husking-rolls.

The space into which the corn is discharged from the elevator-apron forms a receptacle, S, the rear end of which is closed at the side next the elevator Q by longitudinal slats S', while that portion over the husking-rolls has its side next said elevator Q formed of vertical slats S², suitably arranged to permit the husked ears to pass to the elevator, by which they are carried up and discharged into a box or trough, T, which inclines toward one end, as shown in Fig. 6, and may have a discharge-opening, $t$, from which the corn may pass to bags or other receptacles.

At the forward end of the machine, and on opposite sides of the cutter-bar, I support the gatherers U U, which are supported and operated substantially in the same manner, so that the description of one will answer for both. The belts of these gatherers are driven from pinions $e'$ H' on shafts E and H, which shafts may be termed the "drive-shafts" of the gatherers. These gatherers have a main frame formed of a base-bar, V, having an upright bar, $v$, at its forward end and an upright bar, $v'$, at its rear end and an extension-bar, V', secured adjustably to bar $v'$ by a screw, $v^2$, so the upper extremity of the rear end of the frame may be set higher or lower, as desired. In the front bar, $v$, and rear bar, V', are journaled shafts V² V³ for belt V⁴, the rear shaft, V³, being provided with a pinion, V⁵. The pinion V⁵ is meshed by a pinion, $w$, on the connecting-shaft W, which shaft has a universal joint, W', between its ends, and is provided at its end opposite pinion $w$ with a pinion, $w'$, meshed with pinion $e'$ or H'. Near its lower end the shaft W is journaled in a bearing, W², supported on the main frame of the machine, while its upper end is journaled in a bearing, W³, attached to the framing of the gatherer.

The sections of shaft W, journaled in bearings W² W³, are grooved where they fit said bearings, to provide shoulders by which to prevent the endwise shifting of the shaft in its bearings, and yet hold the pinions $w$ and $w'$ properly in mesh with the desired pinions in the different adjustments of the parts. The upper section, 9, of the universal joint $W'$ has a socket, 10, open at its upper end and made non-circular in cross-section. This socket receives the non-circular lower end of the upper section, 11, of the shaft W, and permits a longitudinal movement of said shaft necessary in the upward and downward adjustment of the rear end of the carrier without throwing the parts of the drive mechanism out of operative position.

By the described construction it will be seen the belts $V^4$ will be operated to draw the stalks properly into the cutter. I attach the gatherer-frame to the main frame by providing its rear end with an eye, $y$, engaging an eye, Y, attached to the main frame, so the gatherer-frame may have a limited lateral adjustment.

The gatherers may have their forward ends set in or out and be secured in the desired adjustment by the braces Z, formed in sections $Z' Z'$, adjustably connected by set-screws $z$.

To the under side of the gatherer-frame I attach rods 3, which extend to the rear of the main frame and are connected to the levers 4, which have spring-pawls 5 to engage the racks 6. By pushing the rods 3 forward the forward ends of the gatherers may be uptilted to any required extent.

At the forward ends of the gatherers I provide the V-shaped points 7, pivoted at their lower rear ends to the gatherer-frame and movable at its upper rear end rearwardly, the point being normally sustained in the position shown in full lines, Fig. 11, by a spring, 8, bearing between it and the main gatherer-frame. On striking an obstruction, however, the spring will yield and the point move back, as indicated in dotted lines, Fig. 11, and readily pass over the obstruction.

The operation will be readily understood from the foregoing description.

It will be seen that the several parts are under the control of the operator, and may be readily manipulated as the operation proceeds.

Having thus described my invention, what I claim as new is—

1. In a corn-harvester, the combination of the main frame having eye Y, the gatherer-frame formed with a lower portion or base-bar provided at its ends with upwardly-extended portions forming supports for the belt, the belt extended between said supports, the eye $y$, secured to the gatherer-frame and engaging the eye Y of the main frame, whereby said frames are pivotally connected, and an adjustable brace or support between the lower portion of the gatherer-frame and the harvester main frame, substantially as and for the purposes specified.

2. The combination of the main frame having the eye Y, the gatherer-frame having the eye $y$, engaging said eye Y, the adjustable brace Z, connecting the gatherer-frame with the main frame, and the rod 3, connected with the gatherer-frame and extended rearwardly therefrom and joined with an operating device, substantially as set forth.

3. In a corn-harvester, a gatherer comprising the base-plate V, the upright bar $v$, projected from the front end thereof, the upright bar $v'$, projected from the rear end of said base-plate, the extension $V'$, connected adjustably with the rear upright, $v'$, the shafts journaled in the parts $v$ $V'$, and the belt passed around said shafts, substantially as set forth.

4. In a corn-harvester, the combination, with the gatherer-frame, of the V-shaped point having its base-plate pivoted at its rear end to the gatherer-frame and its top plate extended rearwardly from the forward end of said base-plate, and the spring 8, bearing between the said point and the gatherer-frame and inclosed between the base and top plates of the point and the gatherer-frame, whereby such spring is protected from contact with obstructions in the path of the machine, substantially as and for the purposes specified.

5. The combination, with the main frame having bearing $W^2$ and the gatherer-frame having shafts $V^2$ $V^3$ and bearing $W^3$, and connected adjustably with the main frame, of the shaft W, formed in sections united by a universal joint, and having such sections journaled in bearings $W^2$ and $W^3$, such shaft being geared with shaft $V^3$ and with the drive-shaft, substantially as set forth.

6. The combination of the main frame having eye Y and bearing $W^2$, the gatherer-frame having plate V, provided with uprights or bars $v$ $v'$, the extension $V'$, connected adjustably with upright or bar $v'$, the shafts $V^2$ $V^3$, the latter having pinion $V^5$, the belt $V^4$, the bearing $W^3$, the eye $y$, and the shaft W, formed in sections united by universal joint $W'$ and journaled in bearings $W^2$ $W^3$, substantially as set forth.

7. The combination of the drive-shaft B, having gear $b$, the shaft I, having pinion $i$ and a clutch-section, $i'$, whereby said pinion may be keyed to the shaft, the shafts E, G, and H, gearing between said shafts and the shaft I, the reel-shaft, the carrier-apron, the gatherer-frame, a pinion, $i^2$, on shaft I, arranged to engage the pinion on the reel-shaft, a clutch, $I^2$, for keying pinion $i^2$ to shaft I, and means whereby clutches $i'$ $I^2$ may be independently operated, substantially as set forth.

The above specification of my invention signed by me in the presence of two subscribing witnesses.

ANDREW L. RASMUSON.

Witnesses:
P. B. TURPIN,
SOLON C. KEMON.